United States Patent
Fujisawa et al.

[11] Patent Number: 6,110,597
[45] Date of Patent: Aug. 29, 2000

[54] COATED GLASS FOR BUILDINGS

[75] Inventors: Akira Fujisawa; Koichi Ataka, both of Osaka, Japan

[73] Assignee: Nippon Sheet Glass Co., Ltd, Osaka, Japan

[21] Appl. No.: 09/101,374

[22] PCT Filed: Jan. 9, 1997

[86] PCT No.: PCT/JP97/00030

§ 371 Date: Sep. 24, 1998

§ 102(e) Date: Sep. 24, 1998

[87] PCT Pub. No.: WO97/25287

PCT Pub. Date: Jul. 17, 1997

[30] Foreign Application Priority Data

Jan. 9, 1996 [JP] Japan .................................. 8-001112
Jan. 18, 1996 [JP] Japan .................................. 8-006197

[51] Int. Cl.$^7$ ............................................... B32B 17/00
[52] U.S. Cl. ............................................ 428/432; 428/220
[58] Field of Search ................................ 428/432, 220

[56] References Cited

U.S. PATENT DOCUMENTS 3,647,531  3/1972  Matsushita ................................ 427/108

FOREIGN PATENT DOCUMENTS 1 596 825   4/1971   Germany.
30 05 797   8/1980   Germany.
40-28672   12/1965   Japan.

OTHER PUBLICATIONS

Patent Abstracts of Japan, vol. 096, No. 007, Jul. 31, 1996, JP 08073242, Mar. 19, 1996.
Journal of the Electrochemical Society, vol. 137, No. 1, Jan. 1, 1990, pp. 267–272, Dip–Coating of Sb–Doped $SnO_2$ Films by Ethanolamine–Alkoxide Method, Yasutaka Takahashi and Yukihisa Wada.
Chemical Abstracts, vol. 66, No. 10, Mar. 6, 1967, Abstract No. 40435.
Database WPI, Section Ch, Derwent Publications Ltd., London, GB, Class L01, AN 72–12985T.
Patent Abstracts of Japan, vol. 015, No. 289, Jul. 23, 1991, JP 03 103341, Apr. 30, 1991.

*Primary Examiner*—Timothy M. Speer
*Attorney, Agent, or Firm*—Merchant & Gould P.C.

[57] ABSTRACT

A coated glass (1) comprising a base glass (3) and provided on at least one side thereof a film (2) formed of an oxide of Sn, and oxide of Sb and an oxide of Ti. The glass has characteristics especially suited for buildings.

2 Claims, 1 Drawing Sheet

COATED GLASS FOR BUILDINGS

TECHNICAL FIELD

This invention relates to a coated glass suited especially for buildings, and more particularly to a glass suited for use in building windows from the viewpoint of radio-wave reflection, visible light ray transmittance and so forth.

BACKGROUND ART

In recent years, heat radiation reflecting glass is widely used especially in high-rise buildings so that the buildings can be air-conditioned at a lower load and the hotness due to sunlight can be less felt. The heat radiation reflecting glass reflects to a certain extent not only infrared rays, which hold about 46% of radiation energy from the sun, but also visible light rays, which hold about 50% of the same. However, in order to keep the room comfortable, it is preferable for the visible light rays to he transmitted at a higher rate. As heat radiation reflecting glass having a relatively high visible light ray transmittance, a glass plate on which a multi-layer film comprising a gold or silver metal thin film one side or both sides of which is/are covered with a transparent dielectric material is known in the art (e.g., Japanese Patent Publication No. 40-28672).

However, the glass as disclosed in Japanese Patent Publication No. 40-28672, utilizing the reflection and absorption of a metal thin film, has had the problem that it has no sufficient durability.

DISCLOSURE OF THE INVENTION

An object of the present invention is to provide a coated glass suited for use in buildings from the viewpoint of visible light ray transmittance, visible light ray reflectance, film resistivity (surface resistivity), durability and so forth, and also enabling easy control of these optical characteristics.

The present invention provides a glass for buildings which comprises a base glass and provided on at least one side thereof a film formed of an oxide, wherein the film essentially consists of an oxide of Sn, an oxide of Sb and an oxide of Ti.

In the present invention, while making the most of the properties of a film formed of an oxide of Sb and an oxide of Sn, an oxide of Ti is incorporated in the film to thereby make the characteristics of glass more suitable for use in buildings.

Incorporation of the Ti oxide brings about an increase in visible light ray reflectance and surface resistivity of the film. Hence, according to the present invention, heat radiation shielding performance and exterior beauty can be improved with ease because of an appropriate increase in visible light ray reflectance, and radio-wave obstruction causative of ghost images or the like can be prevented with ease because of the increase in film resistivity.

BEST MODE FOR CARRYING OUT THE INVENTION

Figure 1:
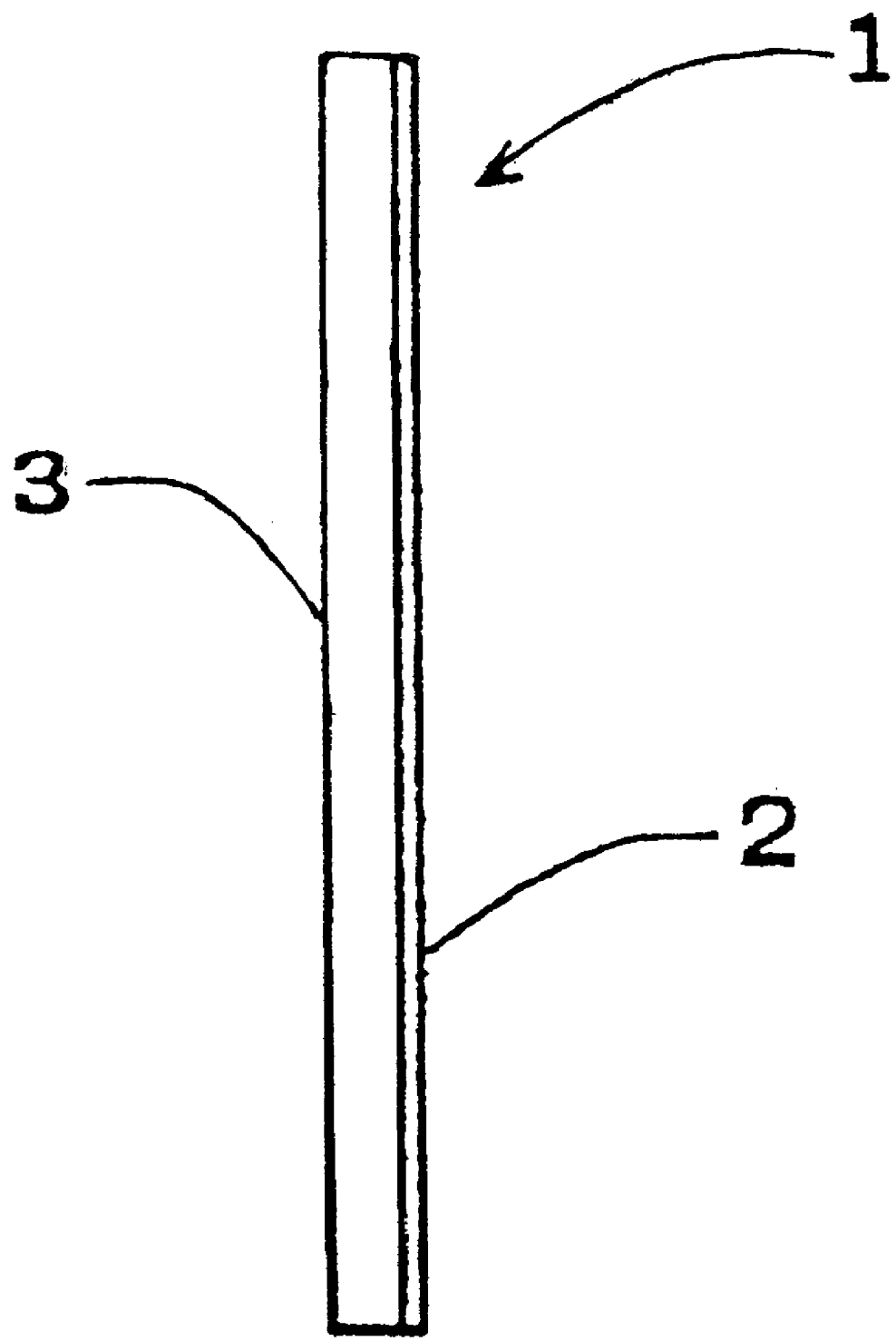
FIG. 1 is a diagrammatic cross section of the glass according to the present invention.

In the present invention, as glass 1 shown in FIG. 1, a film 2 essentially consisting of an oxide of Sn, an oxide of Sb and an oxide of Ti is formed on at least one side of a base glass 3.

The film of the present invention can be formed by sputtering, vacuum deposition or coating. Thermal decomposition processes such as chemical vapor deposition (hereinafter "CVD") and spray processes such as solution spraying, dispersion spraying and powder spraying are preferred from the viewpoint of film durability.

Of the above processes, the solution spraying may be carried out by spraying on a high-temperature base glass a solution prepared by dissolving Sn, Sb and Ti compounds in a known solvent including water, alcohols such as methanol and isopropyl alcohol, toluene, xylene, or a mixed solvent of any of these. In the dispersion spraying or powder spraying, the above solution may be replaced with a dispersion prepared by dispersing in a solution or the same solvent as the above any fine particles containing Sn, Sb and Ti compounds or a powder containing Sn, Sb and Ti compounds. In these spraying processes, a solution prepared by previously mixing the respective components may be sprayed in the form of fine droplets or powder, or the respective components may be individually formed into droplets or powder so as to be simultaneously sprayed or reacted. In the CVD, vapor for the formation of a layer containing the above compounds may be used.

Materials usable in the spray processes or the thermal decomposition processes such as CVD are exemplified below.

Materials for Sn may include tin tetrachloride, dimethyltin dichloride, dibutyltin dichloride, tetrabutyltin, dioctyltin dichloride, tetraoctyltin, dibutyltin oxide, dioctyltin dilaurate, dibutyltin fatty acid esters, monobutyltin trichloride, dibutyltin diacetate, dioctyltin diacetate and dioctyltin dilaurate. Materials for Sb may include antimony trichloride, antimony pentachloride, triphenylantimony, antimony methoxide, antimony ethoxide, antimony butoxide, antimony fatty acid esters, antimony acetate and antimony oxychloride. The Sb materials may also include a combination of solvents to which $Sb_2O_5$ and HCl are added.

Materials for Ti may include titanium tetrachloride, titanium tetraethoxide, acetylacetone titanium oxysulfate, titanous sulfate, titanic sulfate, titanium tetrabutoxide, titanium isopropoxide, titanium methoxide, titanium diisopropoxide, titanium diisopropoxybisoctylene glycoxide, titanium dinormalpropoxybisoctylene glycoxide, diisopropoxymoncoctylene glycoxyacetylacetonatotitanium, dinormalbutoxymonooctylene glycoxyacetylacetonatotitanium, titanium tetraoctylene glycoxide, and dinormalpropoxybisacetylacetonatotitanium.

The above materials may be mixed in appropriate amounts so as to provide an Sb content of from 2 to 50% by weight and a Ti content of from 0.1 to 75% by weight, the balance being an Sn content (or 10 to 97.9% by weight), based on the total weight of metals in the film finally formed.

The glass for buildings according to the present invention may preferably have a film resistivity of $10^5$ Ω/square or above. In general, the obstruction of radio-wave reflection that is causative of the phenomenon of ghost images or the like can be prevented so long as the film resistivity is at least $10^4$ Ω/square. Since, however, the obstruction of radio-wave reflection is especially questioned in recent years, it is preferable to make the film resistivity not lower than $10^5$ Ω/square, and more preferably not lower than $10^6$ Ω/square. According to the present invention, the addition of Ti can make the film resistivity not lower than $10^5$ Ω/square with ease. In the present invention, as will be shown in Examples described later, it has been confirmed that the film resistivity can be made not lower than $10^6$ Ω/square when Ti is contained in an amount of 10% or more based on the total weight of metals in the film.

The visible light ray reflectance also increases with an increase in the amount of Ti added. The glass for buildings according to the present invention may preferably have a visible light ray reflectance (which refers to reflectance on the surface of the side on which the film is formed; the same applies hereinafter) of 20% or above. In general, the value added to the aesthetic appearance that is characteristic of heat radiation reflecting glass can be perceived when the visible light ray reflectance is at least about 10%. However, when such a value added should be more emphasized or the heat radiation shielding performance should be improved, it is preferable for the glass to have a visible light ray reflectance of 20% or above. According to the present invention, the visible light ray of 20% or above can be achieved with ease by appropriately controlling the amount of Ti to be added.

The visible light ray reflectance exceeds 25% in some cases when the film resistivity exceeds $10^6$ $\Omega$/square with an increase in the amount of Ti. From the viewpoint of preventing what is called reflected-light pollution to the building neighborhood, the visible light ray reflectance may preferably be not higher than 25%. When importance is attached to the obstruction of radio-wave reflection, the glass may preferably have a film surface resistivity of $10^6$ $\Omega$/square or above and a visible light ray reflectance of from about 20% to about 35%.

The film according to the present invention can have a better durability when formed by a thermal decomposition process than when formed by other processes such as sputtering.

That is, the glass for buildings according to the present invention may preferably be glass whose coating film is formed by a thermal decomposition process. Stated specifically, the film may be continuously produced on the line of glass manufacture carried out by a float process. A film having a good durability can be thereby obtained in a good productivity.

In order to more improve the film durability, the Sb may preferably be incorporated in a proportion of 5% or more as a proportion held in the total weight of metals in the film.

In the present invention, in order to control color tone, optical characteristics and film durability, any of metal salts such as salts of cobalt, iron, manganese, nickel, chromium, vanadium, bismuth, copper, zirconium, zinc, aluminum, silicon and indium and halogen elements such as fluorine, chlorine and bromine may be incorporated in the film so long as the object of the present invention is not damaged.

The film according to the present invention may preferably be formed in a thickness of from 10 to 200 nm, and more preferably from 20 to 70 nm.

As the base glass, soda lime silica glass is commonly available, with which a high visible light ray transmittance can be achieved with ease. Soda lime silica glass colored in gray, bronze, blue, green or the like may also be used so that the color of transmitted light, the visible light ray transmittance and so forth can be controlled.

EXAMPLES

The present invention will be described below in greater detail by giving Examples. The present invention is by no means limited to these Examples. In the following, "part(s)" is by weight unless particularly noted.

Example 1

Soda lime silica glass with a size of 150×150 mm and a thickness of 6 mm was cleaned and dried, and was used as the base glass. This base glass was fastened with a hanger and kept stood for 5 minutes in an electric furnace set at a temperature of 650° C. Thereafter, the base glass was taken out and a material solution prepared by mixing 28.25 g of monobutyltin trichloride, 100 ml of methanol, 3 ml of water, 9.14 g of antimony trichloride and 0.44 g g of dinormal-propoxybisacetylacetonatotitanium was sprayed on the base glass by means of a commercially available spray gun, followed by drying to form a film comprised of a mixture of oxides of Sn, Sb and Ti.

The visible light ray transmittance, visible light ray reflectance, absorbance (a value obtained by subtracting visible light ray transmittance and visible light ray reflectance from 100%), surface resistivity and film thickness of the glass thus obtained are shown in Table 1. The quantities of metals Sn, Sb and Ti in the film were also measured by plasma emission spectroscopic analysis and fluorescent X-ray analysis. Proportions of Sb and Ti in the total weight of metals are shown together in Table 1.

Example 2

Soda lime silica glass with a size of 150×150 mm and a thickness of 6 mm was cleaned and dried, and was used as the base glass. This base glass was fastened with a hanger and kept stood for 5 minutes in an electric furnace set at a temperature of 650° C. Thereafter, the base glass was taken out and a material solution prepared by mixing dioctyltin diacetate, toluene, xylene, triphenylantimony and dinormalpropoxybisacetylacetonato-titanium so as to provide the Sb and Ti content as shown in Table 1 was sprayed on the base glass by means of a commercially available spray gun, followed by drying to form a film comprised of a mixture of oxides of Sn, Sb and Ti.

The characteristics and so forth of the glass thus obtained were measured in the same manner as in Example 1 to obtain the results as shown in Table 1.

Example 3

Soda lime silica glass with a size of 150×150 mm and a thickness of 6 mm was cleaned and dried, and was used as the base glass. This base glass was fastened with a hanger and kept stood for 5 minutes in an electric furnace set at a temperature of 650° C. Thereafter, the base glass was taken out and a material solution prepared by mixing dioctyltin diacetate, toluene, xylene, dinormalpropoxybisacetylac-etonatotitanium and antimony butoxide so as to provide the Sb and Ti content as shown in Table 1 was sprayed on the base glass by means of a commercially available spray gun, followed by drying to form a film comprised of a mixture of oxides of Sn, Sb and Ti.

The characteristics and so forth of the glass thus obtained were measured in the same manner as in Example 1 to obtain the results as shown in Table 1.

Example 4

Soda lime silica glass with a size of 150×150 mm and a thickness of 6 mm was cleaned and dried, and was used as the base glass. This base glass was fastened with a hanger and kept stood for 5 minutes in an electric furnace set at a temperature of 650° C. Thereafter, the base glass was taken out and a material solution prepared by mixing a dibutyltin fatty acid ester $(C_4H_9)_2Sn(OCOC_7H_{15})_2$, toluene, xylene, isopropyl alcohol, dinormalpropoxybisacetylac-etonatotitanium and triphenylantimony so as to provide the Sb and Ti content as shown in Table 1 was sprayed on the base glass by means of a commercially available spray gun, followed by drying to form a film comprised of a mixture of oxides of Sn, Sb and Ti.

The characteristics and so forth of the glass thus obtained were measured in the same manner as in Example 1 to obtain the results as shown in Table 1.

As shown in Table 1, all of the glass for buildings according to Examples 1 to 4 have a visible light ray transmittance of 60% or above, a visible light ray reflectance of 20 to 25%, an absorbance of 14% or above and a film surface resistivity of $10^5$ to $10^7$ Ω/square when soda lime silica glass of 6 mm thick was used as the base glass.

Comparative Examples 1 and 2

Soda lime silica glass with a size of 150×150 mm and a thickness of 6 mm was cleaned and dried, and was used as the base glass. This base glass was fastened with a hanger and kept stood for 5 minutes in an electric furnace set at a temperature of 650° C. Thereafter, the base glass was taken out and a material solution prepared by mixing a dibutyltin fatty acid ester $(C_4H_9)_2Sn(OCOC_7H_{15})_2$, toluene, xylene, isopropyl alcohol, and triphenylantimony so as to provide the Sb content as shown in Table 1 was sprayed on the base glass by means of a commercially available spray gun, followed by drying to form a film comprised of a mixture of oxides of Sn and Sb (Comparative Example 1).

The above procedure was repeated except that the respective materials were mixed so as to provide the Sb content as shown in Table 1 (Comparative Example 2).

The characteristics and so forth of each glass thus obtained were measured in the same manner as in Example 1 to obtain the results as shown in Table 1.

Comparative Example 3

Soda lime silica glass with a size of 150×150 mm and a thickness of 6 mm was cleaned and dried, and was used as the base glass. This base glass was fastened with a hanger and kept stood for 5 minutes in an electric furnace set at a temperature of 650° C. Thereafter, the base glass was taken out and a material solution prepared by mixing a dibutyltin fatty acid ester $(C_4H_9)_3Sn(OCOC_7H_{15})_2$, toluene, xylene, isopropyl alcohol, acetylacetonatocobalt and triphenylantimony so as to provide the Sb and Co content as shown in Table 1 was sprayed on the base glass by means of a commercially available spray gun, followed by drying to form a film comprised of a mixture of oxides of Sn, Sb and Co.

The characteristics and so forth of each glass thus obtained were measured in the same manner as in Example 1 to obtain the results as shown in Table 1. In Table 1, the proportion of Co is indicated in place of the proportion of Ti. (In the following Comparative Examples too, the proportion of metal incorporated in place of Ti is indicated in Table 1.)

Comparative Example 4

Soda lime silica glass with a size of 150×150 mm and a thickness of 6 mm was cleaned and dried, and was used as the base glass. This base glass was fastened with a hanger and kept stood for 5 minutes in an electric furnace set at a temperature of 650° C. Thereafter, the base glass was taken out and a material solution prepared by mixing a dibutyltin fatty acid ester $(C_4H_9)_2Sn(OCOC_7H_{15})_2$, toluene, xylene, isopropyl alcohol, acetylacetonatonickel and triphenylantimony so as to provide the Sb and Ni content as shown in Table 1 was sprayed on the base glass by means of a commercially available spray gun, followed by drying to form a film comprised of a mixture of oxides of Sn, Sb and Ni.

The characteristics and so forth of each glass thus obtained were measured in the same manner as in Example 1 to obtain the results as shown in Table 1.

Comparative Example 5

Soda lime silica glass with a size of 150×150 mm and a thickness of 6 mm was cleaned and dried, and was used as the base glass. This base glass was fastened with a hanger and kept stood for 5 minutes in an electric furnace set at a temperature of 650° C. Thereafter, the base glass was taken out and a material solution prepared by mixing a dibutyltin fatty acid ester $(C_4H_9)_2Sn(OCOC_7H_{15})_2$, toluene, xylene, isopropyl alcohol, acetylacetonatoiron and triphenylantimony so as to provide the Sb and Fe content as shown in Table 1 was sprayed on the base glass by means of a commercially available spray gun, followed by drying to form a film comprised of a mixture of oxides of Sn, Sb and Fe.

The characteristics and so forth of each glass thus obtained were measured in the same manner as in Example 1 to obtain the results as shown in Table 1.

Comparative Example 6

Soda lime silica glass with a size of 150×150 mm and a thickness of 6 mm was cleaned and dried, and was used as the base glass. This base glass was fastened with a hanger and kept stood for 5 minutes in an electric furnace set at a temperature of 650° C. Thereafter, the base glass was taken out and a material solution prepared by mixing a dibutyltin fatty acid ester $(C_4H_9)_2Sn(OCOC_7H_{15})_2$, toluene, xylene, isopropyl alcohol, acetylacetonatochromium and triphenylantimony so as to provide the Sb and Cr content as shown in Table 1 was sprayed on the base glass by means of a commercially available spray gun, followed by drying to form a film comprised of a mixture of oxides of Sn, Sb and Cr.

The characteristics and so forth of each glass thus obtained were measured in the same manner as in Example 1 to obtain the results as shown in Table 1.

A is seen from Table 1, in Examples 1 to 4, in which the Ti oxide is incorporated as an additive to the Sn oxide/Sb oxide film, no remarkable decrease in absorbance is seen, in contrast to Comparative Examples in which the Co oxide, the Ni oxide or the Fe oxide is incorporated. Incorporation of the Ti oxide brings about a remarkable increase in surface resistivity.

TABLE 1

| Visible light ray transmittance (%) | Visible light ray reflectance (%) | Absorbance (%) | Surface resistivity (Ω/square) | Proportion of: | | Film thickness (nm) |
|---|---|---|---|---|---|---|
| | | | | Sb (wt. %) | Ti (wt. %) | |
| Example: | | | | | | |
| 1 | 64.1 | 20.7 | 15.1 | $1.0 \times 10^5$ | 30 | 0.46 | 40 |
| 2 | 63.5 | 21.5 | 15.0 | $1.6 \times 10^5$ | 30 | 0.46 | 55 |
| 3 | 65.1 | 20.9 | 14.0 | $1.4 \times 10^5$ | 28 | 2.59 | 38 |
| 4 | 64.5 | 21.3 | 14.2 | $1.7 \times 10^5$ | 28 | 2.87 | 45 |

TABLE 1-continued

| | Visible light ray transmittance (%) | Visible light ray reflectance (%) | Absorbance (%) | Surface resistivity (Ω/square) | Proportion of: Sb | Proportion of: Ti (wt. %) | Film thickness (nm) |
|---|---|---|---|---|---|---|---|
| Comparative Example: | | | | | | | |
| 1 | 62.7 | 20.7 | 16.6 | $1.0 \times 10^5$ | 30 | — | 35 |
| 2 | 66.4 | 19.4 | 14.2 | $1.7 \times 10^3$ | 24 | — | 52 |
| 3 | 73.1 | 21.3 | 5.7 | $5.4 \times 10^4$ | 25 | 9.06(Co) | 50 |
| 4 | 71.5 | 19.7 | 8.8 | $2.3 \times 10^4$ | 25 | 2.33(Ni) | 52 |
| 5 | 68.8 | 20.0 | 11.2 | $4.1 \times 10^4$ | 30 | 5.46(Fe) | 50 |
| 6 | 66.8 | 20.0 | 13.2 | $1.4 \times 10^4$ | 28 | 2.13(Cr) | 50 |

Examples are shown below in which the proportion of the Ti oxide is made greater to make the film resistivity not lower than $10^6$ Ω/square.

Example 5

Soda lime silica glass with a size of 150×150 mm and a thickness of 10 mm was cleaned and dried, and was used as the base glass. This base glass was fastened with a hanger and kept stood for 5 minutes in an electric furnace set at a temperature of 650° C. Thereafter, the base glass was taken out and a material solution prepared by mixing 28.25 g of monobutyltin trichloride, 100 ml of methanol, 5 ml g of water, 9.14 g of antimony trichloride and 43.33 g of dinormalpropoxybisacetylacetonatotitanium was sprayed on the base glass by means of a commercially available spray gun, followed by drying to form a film comprised of a mixture of oxides of Sn, Sb and Ti.

The visible light ray transmittance, visible light ray reflectance, surface resistivity and film thickness of the glass thus obtained are shown in Table 2. The quantities of metals Sn, Sb and Ti in the film were also measured by plasma emission spectroscopic analysis and fluorescent X-ray analysis. Proportions of Sb and Ti in the total weight of metals are shown together in Table 1.

Samples prepared in the same way as the above were also immersed in a 1N aqueous sulfuric acid or sodium hydroxide solution kept at 40° C., to make evaluation of chemical resistance. An instance where no change was seen in the film after 2 days was evaluated as "A"; an instance where no change was seen in the film after 1 day but a change was seen after 2 days, as "B"; and an instance where a change was seen in the film after 1 day, as "C". Results obtained are also shown in Table 2.

Example 6

Soda lime silica glass with a size of 150×150 mm and a thickness of 6 mm was cleaned and dried, and was used as the base glass. This base glass was fastened with a hanger and kept stood for 5 minutes in an electric furnace set at a temperature of 650° C. Thereafter, the base glass was taken out and a material solution prepared by mixing 8.11 g of a dibutyltin fatty acid ester $(C_4H_9)_2Sn(OCOC_7H_{15})_2$, 13.9 g of toluene, 4.33 g of xylene, 5.6 g of isopropyl alcohol, 4.33 g of dinormalpropoxybisacetylacetonatotitanium and 5.5 g of triphenylantimony was sprayed on the base glass by means of a commercially available spray gun, followed by drying to form a film comprised of a mixture of oxides of Sn, Sb and Ti.

The characteristics and so forth of the glass thus obtained were measured in the same manner as in Example 5 to obtain the results as shown in Table 2.

Example 7

Soda lime silica glass with a size of 150×150 mm and a thickness of 6 mm was cleaned and dried, and was used as the base glass. This base glass was fastened with a hanger and kept stood for 5 minutes in an electric furnace set at a temperature of 650° C. Thereafter, the base glass was taken out and a material solution prepared by mixing 8.11 g of a dibutyltin fatty acid ester $(C_4H_9)_2Sn(OCOC_7H_{15})_2$, 13.9 g of toluene, 8.67 g of xylene, 5.6 g of isopropyl alcohol, 8.67 g of dinormalpropoxybisacetylacetonatotitanium and 5.5 g of triphenylantimony was sprayed on the base glass by means of a commercially available spray gun, followed by drying to form a film comprised of a mixture of oxides of Sn, Sb and Ti.

The characteristics and so forth of the glass thus obtained were measured in the same manner as in Example 5 to obtain the results as shown in Table 2.

Example 8

Soda lime silica glass with a size of 150×150 mm and a thickness of 6 mm was cleaned and dried, and was used as the base glass. This base glass was fastened with a hanger and kept stood for 5 minutes in an electric furnace set at a temperature of 650° C. Thereafter, the base glass was taken out and a material solution prepared by mixing 8.11 g of a dibutyltin fatty acid ester $(C_4H_9)_2Sn(OCOC_7H_{15})_2$, 13.9 g of toluene, 17.33 g of xylene, 5.6 g of isopropyl alcohol, 17.33 g of dinormalpropoxybisacetylacetonatotitanium and 5.5 g of triphenylantimony was sprayed on the base glass by means of a commercially available spray gun, followed by drying to form a film comprised of a mixture of oxides of Sn, Sb and Ti.

The characteristics and so forth of the glass thus obtained were measured in the same manner as in Example 5 to obtain the results as shown in Table 2.

Example 9

Soda lime silica glass with a size of 150×150 mm and a thickness of 6 mm was cleaned and dried, and was used as the base glass. This base glass was fastened with a hanger and kept stood for 5 minutes in an electric furnace set at a temperature of 650° C. Thereafter, the base glass was taken out and a material solution prepared by mixing 8.11 g of a dibutyltin fatty acid ester $(C_4H_9)_2Sn(OCOC_7H_{15})_2$, 13.9 g of toluene, 43.33 g of xylene, 5.6 g of isopropyl alcohol, 43.33 of dinormalpropoxybisacetylacetonatotitanium and 5.5 g of triphenylantimony was sprayed on the base glass by means of a commercially available spray gun, followed by drying to form a film comprised of a mixture of oxides of Sn, Sb and Ti.

The characteristics and so forth of the glass thus obtained were measured in the same manner as in Example 5 to obtain the results as shown in Table 2.

Examples 10 to 12

Soda lime silica glass with a size of 150×150 mm and a thickness of 10 mm was cleaned and dried, and was used as the base glass. This base glass was fastened with a hanger and kept stood for 5 minutes in an electric furnace set at a temperature of 650° C. Thereafter, the base glass was taken out and a material solution prepared by mixing a dibutyltin fatty acid ester $(C_4H_9)_2Sn(OCOC_7H_{15})_2$, toluene, xylene, isopropyl alcohol, dinormalpropoxybisacetylac- etonatotitanium and triphenylantimony so as to provide each Sb and Ti content as shown in Table 2 was sprayed on the base glass by means of a commercially available spray gun, followed by drying to form a film comprised of a mixture of oxides of Sn, Sb and Ti.

xylene, isopropyl alcohol and dinormalpropoxybisacetylac- etonatotitanium so as to provide the Ti content as shown in Table 1 was sprayed on the base glass by means of a commercially available spray gun, followed by drying to form a film comprised of an oxide of Ti.

The characteristics and so forth of the glass thus obtained were measured in the same manner as in Example 5 to obtain the results as shown in Table 2.

The data on the glass obtained in Comparative Example 2 are also shown together in Table 2.

TABLE 2

| | Glass thickness (mm) | Visible light ray transmittance (%) | Visible light ray reflectance (%) | Surface resistivity (Ω/square) | Proportion of: Sb (wt. %) | Proportion of: Ti (wt.%) | Film thickness (nm) | Acid resistance | Alkali resistance |
|---|---|---|---|---|---|---|---|---|---|
| Example: | | | | | | | | | |
| 5 | 10 | 65.0 | 29.3 | >1 × 10$^6$ | 5 | 63 | 30 | A | A |
| 6 | 6 | 69.3 | 25.3 | >1 × 10$^6$ | 16 | 10 | 49 | A | A |
| 7 | 6 | 65.2 | 29.9 | >1 × 10$^6$ | 13 | 20 | 45 | A | A |
| 8 | 6 | 63.8 | 31.7 | >1 × 10$^6$ | 6 | 38 | 40 | A | A |
| 9 | 6 | 61.0 | 32.9 | >1 × 10$^6$ | 4 | 67 | 40 | B | A |
| 10 | 10 | 70.4 | 23.5 | >1 × 10$^6$ | 13 | 20 | 33 | A | A |
| 11 | 10 | 68.9 | 26.6 | >1 × 10$^6$ | 9 | 38 | 30 | A | A |
| 12 | 10 | 65.1 | 29.7 | >1 × 10$^6$ | 5 | 64 | 28 | A | A |
| Comparative Example: | | | | | | | | | |
| 2 | 6 | 66.4 | 19.4 | 1.7 × 10$^3$ | 24 | — | 52 | A | A |
| 7 | 6 | 65.9 | 28.5 | >1 × 10$^6$ | — | 25 | 38 | B | C |
| 8 | 6 | 61.8 | 33.2 | >1 × 10$^6$ | — | 100 | 50 | B | B |

The characteristics and so forth of each glass thus obtained were measured in the same manner as in Example 5 to obtain the results as shown in Table 2.

Comparative Example 7

Soda lime silica glass with a size of 150×150 mm and a thickness of 6 mm was cleaned and dried, and was used as the base glass. This base glass was fastened with a hanger and kept stood for 5 minutes in an electric furnace set at a temperature of 650° C. Thereafter, the base glass was taken out and a material solution prepared by mixing a dibutyltin fatty acid ester $(C_4H_9)_2Sn(OCOC7H_{15})_2$, toluene, xylene, isopropyl alcohol and dinormalpropoxybisacetylac- etonatotitanium so as to provide the Ti content as shown in Table :1 was sprayed on the base glass by means of a commercially available spray gun, followed by drying to form a film comprised of a mixture of oxides of Sn and Ti.

The characteristics and so forth of the glass thus obtained were measured in the same manner as in Example 5 to obtain the results as shown in Table 2.

Comparative Example 8

Soda lime silica glass with a size of 150×150 mm and a thickness of 6 mm was cleaned and dried, and was used as the base glass. This base glass was fastened with a hanger and kept stood for 5 minutes in an electric furnace set at a temperature of 650° C. Thereafter, the base glass was taken out and a material solution prepared by mixing g of toluene, As shown in Table 2, all of the glass for buildings according to Examples 5 to 12 have a visible light ray transmittance of 60% or above, a visible light ray reflectance of 20 to 35%, an absorbance of 14% or above and a film surface resistivity exceeding 10$^5$ Ω/square when soda lime silica glass of 6 mm or 10 mm thick was used as the base glass. As is also seen therefrom, the film is improved in chemical durability so long as the Sb is in a proportion of 5% or above.

Industrial Applicability

As described above, the present invention makes it possible to provide a coated glass suited for use in buildings from the viewpoint of visible light ray transmittance, visible light ray reflectance, film resistivity, durability and so forth, and also enabling easy control of these optical characteristics.

What is claimed is:

1. A glass for buildings which comprises a base and provided on at least one side thereof a film formed of an oxide, wherein said film consists essentially of an oxide of Sn, an oxide of Sb and an oxide of Ti and has a surface resistivity of 10$^5$ Ω/square or above, and Sb is in a proportion of from 5% to 50% by weight, Sn is in a proportion of from 10% to 97.9% by weight and Ti is in a proportion of from 0.1% to 75% by weight based on the total weight of metals in the film.

2. The glass for buildings according to claim 1, wherein said film has a thickness of from 10 nm to 200 nm.

* * * * *